United States Patent
Matsuo et al.

(10) Patent No.: US 6,753,069 B1
(45) Date of Patent: Jun. 22, 2004

(54) RESIN COMPOSITION FOR INK JET RECORDING SHEET, THE RECORDING SHEET, RECORDING METHOD OF THE SAME, AND METHOD FOR PRODUCING THE RECORDING SHEET

(75) Inventors: Katsuaki Matsuo, Kyoto (JP); Takayuki Tsubaki, Kyoto (JP)

(73) Assignees: Dai-Ichi Kogyo Seiyaku Co., Ltd., Kotyo (JP); Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 09/806,615
(22) PCT Filed: Apr. 5, 2000
(86) PCT No.: PCT/JP00/02190
§ 371 (c)(1), (2), (4) Date: Mar. 29, 2001
(87) PCT Pub. No.: WO01/78990
PCT Pub. Date: Oct. 25, 2001

(51) Int. Cl.$^7$ .......................... B32B 27/06; B32B 27/08; C08L 71/02; C08L 33/08; C08L 37/00
(52) U.S. Cl. .................... 428/195.1; 524/517; 524/521; 524/523; 525/187
(58) Field of Search ................................ 524/521, 523, 524/528, 517; 525/113, 187; 428/195.1, 511, 195

(56) References Cited

U.S. PATENT DOCUMENTS

| | | | | |
|---|---|---|---|---|
| 4,830,911 A | * | 5/1989 | Kojima et al. | 428/342 |
| 5,372,884 A | * | 12/1994 | Abe et al. | 428/331 |
| 5,859,141 A | * | 1/1999 | Tsubaki et al. | 525/218 |
| 6,153,288 A | * | 11/2000 | Shih et al. | 428/195 |
| 6,387,594 B1 | * | 5/2002 | Kakishita et al. | 430/300 |

FOREIGN PATENT DOCUMENTS

| | | | |
|---|---|---|---|
| EP | 0 896 883 | | 2/1999 |
| JP | 04198308 A | * | 7/1992 |
| JP | 07-001829 | | 1/1995 |
| JP | 07-009757 | | 1/1995 |
| JP | 07195826 A | * | 1/1995 |
| JP | 09-216456 | | 8/1997 |
| JP | 09296035 A | * | 11/1997 |
| JP | 10-006637 | | 1/1998 |
| JP | 10-071763 | | 3/1998 |
| JP | 10-147058 | | 6/1998 |
| JP | 11-078217 | | 3/1999 |
| JP | 11123869 A | * | 5/1999 |
| JP | 11208107 A | * | 8/1999 |
| JP | 2000-127612 | | 5/2000 |
| JP | 2000-135857 | | 5/2000 |

OTHER PUBLICATIONS

English Translation of JP 11123869 A (1999).*
English Translation of JP 09296035 A (1997).*
Machine Translation of JP 11123869 (1999).*
Machine Translation of JP 09296035 (1997).*
Machine Translation of JP 07195826 (1995).*
Machine Translation of JP 11208107 (1999).*

* cited by examiner

Primary Examiner—Callie Shosho
(74) Attorney, Agent, or Firm—Marshall, Gerstein & Borun LLP

(57) ABSTRACT

A resin composition for an ink jet recording sheet, an ink jet recording sheet, a method for ink jet recording, and a method for producing an ink jet recording sheet are provided, wherein an ink absorption ability and a blurring suppressive effect are satisfactorily achieved. The ink jet recording sheet is prepared from a substrate layer and an ink-receiving layer that is overlaid said substrate layer. The ink-receiving layer contains (1) a major component of a water-absorbing polymer compound represented by the formula (I), and (2) a cationic polymer compound. A mixing ratio by weight of the water-absorbing polymer compound (1) and the cationic polymer compound (2) may be in the range between 50/50 and 99/1. A cationic or nonionic surface active agent (3) may be contained in the ink-receiving layer in an amount from 1% by weight to 10% by weight.

19 Claims, No Drawings

RESIN COMPOSITION FOR INK JET RECORDING SHEET, THE RECORDING SHEET, RECORDING METHOD OF THE SAME, AND METHOD FOR PRODUCING THE RECORDING SHEET

FIELD OF THE INVENTION

The present invention relates to a resin composition for an ink jet recording sheet, an ink jet recording sheet, a method for ink jet recording, and a method for producing an ink jet recording sheet. More particularly, the present invention relates to a resin composition that is suitable for ink jet recording in which a water-based ink is used, such an ink jet recording sheet, a method for ink jet recording in which a water-based ink is used, and a method for producing such an ink jet recording sheet.

BACKGROUND OF THE INVENTION

Ink jet recording is quiet, allows for high-speed printing, makes multicolored printing possible by using a plurality of nozzles, and is low in cost. Therefore, its use rapidly became wide-spread as output devices for image information, such as color copying, computers, and the like. Media for this ink jet recording require properties as follows:

(1) absorption velocity of ink is rapid;
(2) ink can be immediately evaporated to dryness;
(3) diffusion upon absorption of ink, and formation of unclear marginal portions of dots, are avoided;
(4) incidence rates of lack in printing uniformity is low;
(5) clear interfaces between different color zones can be provided; and
(6) quality stability is maintained over the long-term preservation after printing, particularly a low incidence of inferior alteration of images, such as blurring even under humid conditions, is provided.

Conventionally, an ink jet recording sheet has been utilized which comprises a water insoluble film as a support and hydrophilic polymer as a major component of an ink absorption layer that is over-laid on the support. The hydrophilic polymer may include water soluble polymers, e.g., polyvinyl alcohol, denaturated polyvinyl alcohol, polyvinyl pyrrolidone, gelatin, and the like. Further, ink jet recording sheets comprising combinations of the above-described hydrophilic polymer and a water-absorbing resin, and combinations with porous inorganic powder, such as silica, alumina, and the like, also have been proposed. However, problems are suggested in that the water soluble resin overlaid as an ink absorption layer absorbs water during storage, thus blurring of ink results when recording is carried out using these ink jet recording sheets.

In order to overcome such disadvantages, an ink jet recording sheet is proposed that contains a cationic substance in the ink absorption layer, which would prevent blurring of ink through reactions between the cationic substance and anionic dyes that are used in the water-based ink. However, this type of ink jet recording sheet may lead to bleed out of the cationic substance on the surface of an ink-receiving layer due to an inferior mutual solubility between the cationic substance and the water soluble polymer. In addition, because such cationic substances have no thermoplasticity, manufacturing restrictions also may result, namely coating application with a solution must be conducted to produce the ink jet recording sheet. Moreover, the fixative property of reaction products between the cationic substance and anionic dyes that are ingredients of ink may be insufficient. Consequently, prevention of blurring phenomenon may sometimes be impossible. Additionally, alteration of color tone may be developed from reaction products of the cationic substance and anionic dyes.

As explained heretofore, an ink jet recording sheet that satisfies all of the various desired properties has not yet been accomplished. The present invention was achieved taking these problems into account, and is directed to providing a resin composition for an ink jet recording sheet, an ink jet recording sheet, a method for ink jet recording, and a method for producing an ink jet recording sheet, which can be satisfactory in various desired properties, particularly an ink absorption ability and a blurring suppressive effect.

SUMMARY OF THE INVENTION

The present invention that accomplishes the objects set forth above is directed to a resin composition for ink jet recording which comprises (1) a major component of a water-absorbing polymer compound represented by the formula (I) below, and (2) a cationic polymer compound.

In formula (I), "A" consists of:

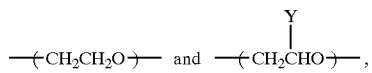

with a manner of linkage therebetween being:

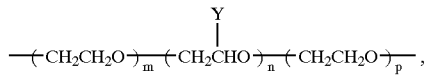

wherein m, n, and p represent integer numbers greater than or equal to 1. Additionally, a weight ratio that is calculated on the basis of each of the recurrence numbers m, n, and p is predetermined to be 44 ×(m +p)/(the molecular weight of the unit of the alkylene oxide having more than or equal to four carbon atoms)×n=94/6–80/20, while the weight ratio that is calculated on the basis of each of the recurrence numbers m and p, p/(m+p) should be predetermined to be more than or equal to 50 percent by weight. Y represents hydrocarbon group having more than or equal to two carbon atoms. Further, $X^1$ represents a residue of an organic compound having two active hydrogen groups, and R1 represents a residue of a dicarboxylic acid compound.

The resin composition for an ink jet recording sheet of the present invention comprises (1) a major component of a water-absorbing polymer compound represented by the formula (I) above and (2) a cationic polymer compound that is mutually solubilized with the compound (1), accordingly, blurring upon storage under humid conditions can be suppressed while an excellent ink absorption ability is retained.

In this aspect of the present invention, when the following compound (a) or (b) is used alone or in combination as the cationic polymer compound (2), bleed out on a surface of the ink-receiving layer is avoided due to their affinity to the water-absorbing polymer compound (I). In addition, alteration of color tone resulting from reactions with the anionic dyes that are used as ingredients of ink are prevented.

(a) A cationic polymer compound having a weight average molecular weight ranging between 1,000 and 50,000 with linear and irregular arrangement comprising 65 mol % to 99 mol % of an ethylene structural unit represented by the following formula (II), less than or equal to 15 mol % of an acrylate structural unit represented by the following formula (III), and 1 mol % to 35 mol % of an acrylamide structural unit represented by the following formula (IV):

(II)

(III)

wherein $R^2$ represents an alkyl group having 1–4 carbon atoms,

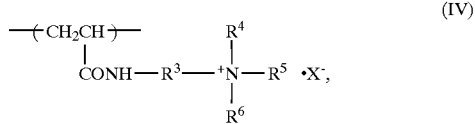
(IV)

wherein $R^3$ represents an alkylene group having 2–8 carbon atoms; $R^4$ and $R^5$ respectively represent an alkyl group having 1–4 carbon atoms; $R^6$ represents an alkyl group having 1–12 carbon atoms, an aryl alkyl group having 7–12 carbon atoms, or an alicyclic alkyl group having 6–12 carbon atoms; and $X^-$ represents a halogen ion, $CH_3OSO_3^-$, or $C_2H_5OSO_3^-$.

(b) A cationic polymer compound having a weight average molecular weight ranging between 1,000 and 50,000 with linear and irregular arrangement comprising 65 mol % to 99 mol % of an ethylene structural unit represented by the above formula (II), less than or equal to 15 mol % of an acrylate structural unit represented by the above formula (III), and 1 mol % to 35 mol % of an acrylamide structural unit represented by the following formula (V):

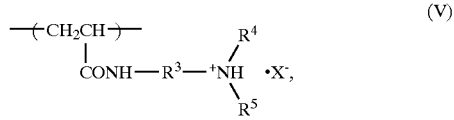
(V)

wherein $R^3$ represents an alkylene group having 2–8 carbon atoms; $R^4$ and $R^5$ respectively represent an alkyl group having 1–4 carbon atoms; and $X^-$ represents a halogen ion, $CH_3OSO_3^-$, or $C_2H_5OSO_3^-$.

The cationic polymer compound (2) of the above-described (a) and (b) preferably comprises the acrylate structural unit represented by the formula (III), although the acrylate structural unit is not a necessary component to be contained therein. Therefore, the mole fraction of this acrylate structural unit is defined only in terms of an upper limit (15 mol %), and a lower limit thereof is not particularly defined.

In the present invention set forth above, when a mixing ratio by weight of the water-absorbing polymer compound (1) and the cationic polymer compound (2) ranges between 50/50 and 99/1, a well-balanced ink absorption ability and blurring suppressive effect can be achieved.

In the present invention set forth above, when a cationic or nonionic surface active agent is contained in the resin composition, blurring upon storage under humid conditions can be more sufficiently suppressed. An amount of surface active agent (3) to be contained may be preferably 1 wt % (percent by weight) to 10 wt %.

When an ink jet recording sheet is prepared by overlaying a substrate layer with an ink-receiving layer in which the resin composition for an ink jet recording sheet is used, and thereafter ink jet recording is performed by discharging small droplets of water-based color ink such that they are adsorbed to the ink-receiving layer, then clear images with less blurring upon storage under humid conditions results.

This ink jet recording sheet can be readily produced by extruding a resin composition that constitutes a substrate layer into a sheet form, while extruding the above-described resin composition for an ink jet recording sheet of the present invention also into a sheet form concurrently with the substrate layer, and simultaneously forming layers from both of the resin compositions.

BEST EMBODIMENT FOR CARRYING OUT THE INVENTION

The most characteristic feature of an ink jet recording sheet according to the present invention is that the ink-receiving layer comprises a principal component of a water-absorbing polymer compound (1) that is represented by the above formula (I). Herein, "comprise a major component of a water-absorbing polymer compound (1)" means that the water-absorbing polymer compound (1) is a major polymer material of the ink-receiving layer. Specifically, the percentage content of the water-absorbing polymer compound (1) in the ink-receiving layer may be preferably greater than or equal to 50 wt %.

A part represented as "A" in the above formula (I) may be in an arrangement, wherein an alkylene oxide chain having more than or equal to 4 carbon atoms, which is designated by a recurrence number n, is interpositioned between an ethylene oxide chain designated by a recurrence number m and an ethylene oxide chain designated by a recurrence number p at opposite ends.

The above alkylene oxide chain having more than or equal to 4 carbon atoms, which is designated by a recurrence number n, may be for example, a butylene oxide chain that is derived from butylene oxide or an α-olefin oxide chain having more than or equal to 12 carbon atoms that is derived from α-olefin oxide having more than or equal to 12 carbon atoms. Namely, in the above formula (I), Y may be an ethyl group when the alkylene oxide chain designated by a recurrence number n is a butylene oxide chain that is derived from butylene oxide. Meanwhile, Y may be a hydrocarbon group having more than or equal to 10 carbon atoms when the alkylene oxide chain designated by a recurrence number n is an α-olefin oxide chain having more than or equal to 12 carbon atoms that is derived from α-olefin oxide having more than or equal to 12 carbon atoms.

Besides, in cases where an α-olefin oxide chain is included, the α-olefin oxide having more than or equal to 12 carbon atoms from which the chain is derived is not particularly restricted as long as it is an epoxide compound containing an alkylene group having more than or equal to 12 carbon atoms, and may be more preferably an epoxide compound containing an alkylene group having carbon atoms ranging between 12 and 30. Such an α-olefin oxide may be used alone or as a mixture in combination of two or more kinds thereof.

When the alkylene oxide chain designated by a recurrence number n is a butylene oxide chain, the two ethylene oxide chains designated by the recurrence numbers m and p may be determined so that those chains are included in the designated part "A" in the above formula (I) from 80 wt % to 90 wt %, preferably from 82 wt % to 87 wt %. Further, when the alkylene oxide chain designated by a recurrence number n is an α-olefin oxide chain having more than or equal to 12 carbon atoms, the two ethylene oxide chains designated by the recurrence numbers m and p may be determined so that those chains are included in the designated part "AA" in the above formula (I) from 90 wet to 94 wt %, preferably from 92 wt%to 9.4 wt %. Accordingly, at the designated part "A" in the above formula (I), a value that is calculated by means of the following formula may be predetermined to be in the range between 80/20 and 94/6: (44×(m+p)/(the molecular weight of the unit of the alkylene oxide having more than or equal to four carbon atoms)×n). For reference, "44" herein denotes a molecular weight of ethylene oxide.

When the ratio of the two ethylene oxide chains designated by the recurrence numbers m and p is below the above range, it may result in a decrease of an ink absorption ability of the ink jet recording sheet. If this ratio is greater than the above range to the contrary, blurring of ink upon storage at a humid condition may occur as a result of absorbing water.

At the designated part "A" in the above Ad formula (I), a value obtained by calculation: "p/(m+p)," namely a ratio of an ethylene oxide chain part designated by the recurrence number p in two of the ethylene oxide chains (parts designated by the recurrence numbers m and p) must be determined to be greater than or equal to 50%, and particularly preferably, in the range between 60% and 80%. Consequently, an esterification reaction and an ester exchange reaction can be readily carried out with dicarboxylic acid compound $R^1$ detailed below.

In the above-described formula (I), a part designated as $X^1$ is a residue of an organic compound having two active hydrogen groups. The organic compounds having two active hydrogen groups may include for example, ethylene glycol, diethylene glycol, propylene glycol, dipropylene glycol, 1,4-butanediol, 1,6-hexanediol, neopentyl glycol, bisphenol A, polytetramethylene glycol; alicyclic diols, such as cyclohexane-1,4-dimethanol and the like; amines such as butylamine, laurylamine, octylamine, cyclohexylamine, aniline and the like. These may be used alone or in combination of two or more kinds thereof.

In the above-described formula (I), a part designated as $R^1$ is a residue of a dicarboxylic acid compound. The applicable dicarboxylic acid compounds may include for example, dicarboxylic acid, dicarboxylic anhydride, lower alkyl ester of dicarboxylic acid, and the like. Dicarboxylic acids described above may include, for example, phthalic acid, isophthalic acid, terephthalic acid, malonic acid, succinic acid, sebacic acid, maleic acid, fumaric acid, adipic acid, itaconic acid, and the like. Dicarboxylic anhydride described above may include, for example, anhydrides of several kinds of dicarboxylic acids described above. In addition, the lower alkyl ester of dicarboxylic acid described above may include, for example, methyl ester, dimethyl ester, ethyl ester, diethyl ester, propyl ester, dipropyl ester, and the like of several kinds of the dicarboxylic acids described above. These may be used alone or in combination of two or more kinds thereof. Among them in particular, dicarboxylic anhydride or lower alkyl ester of dicarboxylic acid preferably may be used in view of feasibility of the reactions.

Because this water-absorbing polymer compound (1) that is represented by formula (I) exhibits water absorption ability that is 5 to 15 times of its own weight, an ink absorption ability can be imparted to the ink-receiving layer through using this compound. Moreover, the water-absorbing polymer compound (1) can be formed into a shape like a sheet by extrusion because of its thermoplasticity. Therefore, facilitated production of an ink jet recording sheet can be achieved.

An exemplary method for producing the water-absorbing polymer compound (1) that is represented by formula (I) is hereinafter explained. First, an organic compound having more than or equal to 2 carbon atoms is subjected to addition polymerization with ethylene oxide at approximately 90–200° C. using caustic alkali, such as sodium hydroxide or potassium hydroxide, as a catalyst. Next, addition polymerization with alkylene oxide having more than or equal to 4 carbon atoms is effected thereto, and then further addition polymerization with ethylene oxide is followed. Namely, ethylene oxide, butylene oxide, or α-olefin oxide having more than or equal to 12 carbon atoms, and then ethylene oxide are subjected to addition polymerization as a block in this order to an organic compound having two active hydrogen groups. By way of caution, the polyalkylene oxide compound that is obtained in this step may preferably have a weight average molecular weight ranging between 5,000 and 30,000, and particularly preferably have a weight average molecular weight ranging between 10,000 and 30,000. When the weight average molecular weight is less than the above range, deterioration in formability of an ink-receiving layer may result. To the contrary, when the weight average molecular weight is greater than the above range, remarkable lowering of reaction velocity for the alkylene oxide addition reaction may be accompanied. Next, a dicarboxylic acid compound is added to the polyalkylene oxide compound. Then, following elevation of the temperature, dehydration or dealcoholation is performed at a reduced pressure of 0.1 to $2.7 \times 10^3$ Pa while heating at 80–250° C. The reaction time may be generally from 30 minutes to 10 hours. Accordingly, the water-absorbing polymer compound (1) is obtained.

When a dicarboxylic acid compound is added to the polyalkylene oxide compound, the incorporation ratio of both compounds is preferably in the range between 1/3.5 and 1/0.5 at an equivalent ratio.

Thus obtained water-absorbing polymer compound (1) preferably may be predetermined to have a weight average molecular weight ranging between 10,000 and 300,000, and particularly preferably between 50,000 and 200,000. Additionally, a value that is resulted from division of a weight average molecular weight of the water-absorbing polymer compound (1) obtained in such a manner with a weight average molecular weight of the polyalkylene oxide compound that is used for the production preferably may be greater than or equal to 3, more preferably in the range between 3 and 21, and still more preferably in the range between 5 and 21.

Another feature of the ink jet recording sheet according to the present invention is characterized by the point that the ink-receiving layer comprises a cationic polymer compound (2). Because the cationic polymer compound (2) may react with anionic dyes that are generally used in water-based ink, blurring of ink thereby can be prevented. In addition, because the cationic polymer compound (2) is a macromolecule, bleed out to the surface of the ink-receiving layer may not result. By way of caution, the cationic polymer compound (2) herein means cationic substances having a weight average molecular weight greater than or equal to 1,000, and preferably greater than or equal to 5,000.

An amount of the cationic polymer compound (2) to be contained preferably may be in the range between 50/50 and 99/1, and more preferably in the range between 65/35 and 90/10 as a mixing ratio by weight of the water-absorbing polymer compound (1) and the cationic polymer compound (2). When the amount of the cationic polymer compound (2) is less than the above range, blurring of ink upon storage of the ink jet recording sheet under humid conditions may occur as a result of absorbing water. To the contrary, when the amount is greater than the above range, an ink absorption ability of the ink-receiving layer may be deteriorated.

As a suitably used cationic polymer compound (2), (a) a cationic polymer compound having a weight average molecular weight ranging between 1,000 and 50,000 with a linear and irregular arrangement comprising 65 mol % to 99 molt of an ethylene structural unit represented by the above formula (II), less than or equal to 15 molt of an acrylate structural unit represented by the above formula (III), and 1 mol % to 35 mol % of an acrylamide structural unit represented by the above formula (IV); and (b) a cationic polymer compound having a weight average molecular weight ranging between 1,000 and 50,000 with a linear and irregular arrangement comprising 65 mol % to 99 mol % of an ethylene structural unit represented by the above formula (II), less than or equal to 15 mol % of an acrylate structural unit represented by the above formula (III), and 1 mol % to 35 mol % of an acrylamide structural unit represented by the above formula (V) may be utilized. Such cationic polymer compounds may be used alone or in combination as a mixture. When such a compound (a) or (b) is employed as the cationic polymer compound (2), blurring of ink is more efficiently prevented, and changes in color tone resulting from a reaction with anionic dyes that are ingredients of the ink may be suppressed.

The cationic polymer compound (2) of the above-described (a) must comprise 65 mol % to 99 mol %, and more preferably, may comprise 65 mol % to 80 mol % of the ethylene structural unit represented by the above formula (II). When the content of the ethylene structural unit is less than the above range, mutual solubility with the water-absorbing polymer compound.(1) may be decreased. To the contrary, when the content of the ethylene structural unit is greater than the above range, a blurring event may result because of a lack in available reactivity with the dyes due to insufficiently present acrylamide structural unit that participates in a reaction with the dyes.

The above-described cationic polymer compound (2) of the above-described (a) must comprise less than or equal to 15 mol %, and more preferably, may comprise 5 molt to 10 mol % of an acrylate structural unit represented by the above formula (III). When the content of the acrylate structural unit is less than the above range, mutual solubility with the water-absorbing polymer compound (1) may not be achieved. When the content of the acrylate structural unit is greater than the above range to the contrary, there may be difficulty in producing the cationic polymer compound (2).

The above-described cationic polymer compound (2) of the above-described (a) must comprise 1 molt to 35 mol %, and particularly preferably, may comprise 10 molt to 30 molt of an acrylamide structural unit represented by the above formula (IV). When the content of the acrylamide structural unit is less than the above range, blurring of ink may occur due to existence of unreacted dyes because reaction equivalence with the dyes falls to an insufficient level. When the content of the acrylamide structural unit is greater than the above range to the contrary, extreme deterioration of mutual solubility with the water-absorbing polymer compound (1) may result.

The above-described cationic polymer compound (2) of the above-described (b) must comprise 65 molt to 99 molt, and more preferably, may comprise 65 molt to 80 mol % of an ethylene structural unit represented by the above formula (II). When the content of the ethylene structural unit is less than the above range, mutual solubility with the water-absorbing polymer compound (1) may be decreased. To the contrary, when the content of the ethylene structural unit is greater than the above range, a blurring event may result because of lack in available reactivity with the dyes due to insufficiently present acrylamide structural unit that participates in a reaction with the dyes.

The above-described cationic polymer compound (2) of the above-described (b) must comprise less than or equal to 15 molt, and more preferably, may comprise 5 molt to 10 molt of an acrylate structural unit represented by the above formula (III). When the content of the acrylate structural unit is less than the above range, mutual solubility with the water-absorbing polymer compound (1) may deteriorate. When the content of the acrylate structural unit is greater than the above range to the contrary, there may be difficulty in producing the cationic polymer compound (2).

The above-described cationic polymer compound (2) of the above-described (b) must comprise 1 mol % to 35 mol %, and particularly preferably, may comprise 10 molt to 30 molt of an acrylamide structural unit represented by the above formula (V). When the content of the acrylamide structural unit is less than the above range, blurring of ink may occur due to existence of unreacted dyes because reaction equivalence with the dyes falls to an insufficient level. When the content of the acrylamide structural unit is greater than the above range to the contrary, extreme deterioration of mutual solubility with the water-absorbing polymer compound (1) may result.

The cationic polymer compounds (2) of the above (a) and (b) have linear and irregular arrangements in each of the formula units. Thermoplasticity is acquired thereby, and thermoforming of the ink-receiving layer becomes feasible combined with thermoplasticity of the water-absorbing polymer compound (1). Moreover, the weight average molecular weight of such cationic polymer compound (2) is in the range between 1,000 and 50,000, and the range between 5,000 and 30,000 is particularly preferred. When the weight average molecular weight is less than the above range, bleed out of the cationic polymer compound (2) may occur on the surface of the ink-receiving layer. To the contrary, when the weight average molecular weight is greater than the above range elevation of the melting viscosity often may result in difficulties in mixing with the water-absorbing polymer compound (1).

It is preferred that the ink-receiving layer of the ink jet recording sheet according to the present invention comprises a cationic or nonionic surface active agent (3). Because hydrophilicity of the ink-receiving layer is increased thereby, absorption velocity of ink can be improved, and in addition, blurring of ink can be prevented.

Suitably employed cationic surface active agents (3) may include, for example, secondary ammonium salt type cationic surface active agents, tertiary ammonium salt type cationic surface active agents, quaternary ammonium salt type cationic surface active agents, and the like. Besides, suitably employed nonionic surface active agents (3) may include, for example, alkyl phenol type nonionic surface active agents, higher alcohol type nonionic surface active agents, higher fatty acid type nonionic surface active agents, Pluronic-type nonionic surface active agents, esters of propylene glycol fatty acid, esters of glycerol fatty acid, and the like.

An amount of the cationic or nonionic surface active agent (3) to be contained in the ink-receiving layer may be preferably 1% by weight to 10% by weight, and particularly preferably, may be 2% by weight to 5% by weight. When the amount of the surface active agent (3) is less than the above range, lowering of the ink absorption velocity may occur, or an incidence of ink blurring may be liable to increase. To the contrary, when the amount is greater than the above range, bleed out on the surface of the ink-receiving layer may occur, thereby stickiness on the surface may result.

Although the thickness of the ink-receiving layer is not particularly limited as long as absorption of the ink can be provided, it is generally in the range between 10 μm and 50 μm, and particularly from 20 μm to 30 μm.

An ink jet recording sheet according to the present invention is prepared from a substrate layer and an ink-receiving layer that is overlaid said substrate layer. The material of the substrate layer is not particularly limited. However, a film that is constituted from water insoluble plastics, for example, polyester resins, polyamides, polyolefins, and the like may be suitably used. In particular, polyester resins having superior film hardness, transparency, and property of adhesion to the receiving layer are preferable. Although the thickness of the substrate layer is not particularly limited, it is generally in the range between 50 μm and 100 μm, and particularly from 70 μm to 100 μm.

A method for producing an ink jet recording sheet of the present invention is explained below. First, a resin composition is prepared by melting and admixing a water-absorbing polymer compound (1) and a cationic polymer compound (2) according to known methods; and adding cationic or nonionic surface active agent (3), if required. Next, the resin composition is pelletized, followed by melting, and extrusion into a film form while concomitantly overlaying the substrate layer so that an ink jet recording sheet can be produced. When the substrate layer is prepared from plastics, the ink jet recording sheet can be produced through so-called coextrusion wherein overlaying is performed while extruding both of the ink-receiving layer and the substrate layer. Simplification of the process for production of the ink jet recording sheet can be achieved by this coextrusion.

Furthermore, an ink jet recording sheet also can be produced by dissolving the resin composition in a solvent that can dissolve the aforementioned resin composition used for the ink-receiving layer (e.g., a mixed solvent of toluene and methanol); and coating the dissolved composition on a substrate layer. For the coating process, several kinds of known means, for example, bar coating machine, roll coating machine, blade coating machine, kiss coating machine, and the like, can be employed.

When a substrate layer is overlaid with an ink-receiving layer by the above-described extrusion or coating, a treatment on the surface of the substrate layer with primer may be conducted in order to improve the adhesion strength of the both layers, if necessary.

When ink jet recording is carried out using this ink jet recording sheet, water-based ink is rapidly absorbed into the ink-receiving sheet, thus clear images can be obtained. Additionally, even when the ink jet recording sheet is subjected to storage after printing under humid conditions for a long period of time, blurring of ink hardly occurs.

The effects exerted by the present inven- tion would be apparent from the Examples below, however, those Examples should not be construed as any limitation of the present invention.

EXAMPLE 1

A water-absorbing polymer compound (1) was prepared, with m being 52, n being 14, p being 155, Y being an ethyl group, $X^1$ being an ethylene glycol residue, and $R^1$ being a eicosanedioic acid residue in the above-described formula (I). The weight ratio of alkylene oxide having 4 or more carbon atoms in the polyalkylene oxide compound was 11 wt % for this water-absorbing polymer compound (1). In addition, the weight average molecular weight of polyalkylene oxide residue represented by $AX^1A$ was 20,294. Further, the weight average molecular weight of this water-absorbing polymer compound (1) was 154,800. For a reference, measurement of a molecular weight was performed by determination through PEO conversion, using GPC in a water-based system with a mixed solution of acetonitrile and water with a ratio of 1:1 as a solvent for dissolving the water-absorbing polymer compound (1).

Meanwhile, a cationic polymer compound (2) was prepared, with $R^2$ being $C_2H_5$ in the above formula (III), $R^3$ being an ethylene group, $R^4$, $R^5$, and $R^6$ being methyl groups, and $X^-$ being $C_2H_5OSO_3^-$ in the above formula (IV). Molar fractions (determined with NMR) in this cationic polymer compound (2) were 65 mol % for an ethylene structural unit represented by the above formula (II); 5 mol % for an acrylate structural unit represented by the above formula (III); and 30 mol % for an acrylamide structural unit represented by the above formula (IV). Moreover, the weight average molecular weight (determined with GPC) of this cationic polymer compound (2) was 23,000.

Then, 80 parts by weight of the water-absorbing polymer compound (1) and 20 parts by weight of the cationic polymer compound (2) were mixed using a double spindle extruder at an extrusion condition of 150° C., thus pelletization was accomplished. Next, the resulting pellet was extruded using a single spindle extruder at 150° C., thereby a film having 40 μm of thickness was formed. Finally, an ink jet recording sheet of Example 1 was produced through overlaying a polyethylene terephthalate film (100 μm of thickness) with thus formed film, followed by lamination process at 160° C.

EXAMPLE 2

A water-absorbing polymer compound (1) was prepared, with m being 28, n being 2, p being 118, Y being a hydrocarbon group having 12–14 carbon atoms, $X^1$ being an ethylene glycol residue, and $R^1$ being a terephthalic acid residue in the above-described formula (I). The weight ratio of alkylene oxide having 4 or more carbon atoms in the polyalkylene oxide compound was 6 wt % for this water-absorbing polymer compound (1). In addition, the weight average molecular weight of polyalkylene oxide residue represented by $AX^1A$ was 13,873. Further, the weight average molecular weight of this water-absorbing polymer compound (1) was 97,111, when it was determined in a similar manner to the method for measurement in the above Example 1.

Meanwhile, a cationic polymer compound (2) was prepared, with $R^2$ being $C_2H_5$ in the above formula (III), $R^3$ being an ethylene group, $R^4$ and $R^5$ being methyl groups, $R^6$ being a lauryl group, and $X^-$ being a chloride ion in the above formula (IV). Molar fractions (determined with NMR) in this cationic polymer compound (2) were: 70 mol % for an ethylene structural unit represented by the above formula (II); 10 mol % for an acrylate structural unit represented by the above formula (III); and 20 mol % for an acrylamide structural unit represented by the above formula (IV). Moreover, the weight average molecular weight (determined with GPC) of this cationic polymer compound (2) was 23,000.

Then, 75 parts by weight of the water-absorbing polymer compound (1) and 25 parts by weight of the cationic polymer compound (2) were used to produce an ink jet recording sheet of Example 2 in a similar manner to the procedure in Example 1.

EXAMPLE 3

A water-absorbing polymer compound (1) was prepared, with m being 42, n being 23, p being 168, Y being an ethyl group, $X^1$ being an ethylene glycol residue, and $R^1$ being a eicosanedioic acid residue in the above-described formula (I). The weight ratio of alkylene oxide having 4 or more carbon atoms in the polyalkylene oxide compound was 18 wt % for this water-absorbing polymer compound (1). In addition, the weight average molecular weight of polyalkylene oxide residue represented by $AX^1A$ was 21,854. Further, the weight average molecular weight of this water-absorbing polymer compound (1) was 139,860, when it was determined in a similar manner to the method for measurement in the above Example 1.

Then, 85 parts by weight of the water-absorbing polymer compound (1) and 15 parts by weight of the cationic polymer compound (2) as in Example 1 were used to produce an ink jet recording sheet of Example 3 in a similar manner to the procedure in Example 1.

EXAMPLE 4

An ink jet recording sheet of Example 4 was produced in a similar manner to the procedure in Example 1, except that the 20 parts by weight of the cationic polymer compound (2) that was used in Example 1 was substituted for a mixture of 10 parts by weight of the cationic polymer compound (2) as in Example 1 and 10 parts by weight of lauryl trimethylammonium chloride as a cationic surface active agent (3) that had been previously mixed and pelletized with a heated roll at 150° C.

Comparative Example 1

An ink jet recording sheet of Comparative Example 1 was produced in a similar manner to the procedure in Example 1, except that 100 parts by weight of the water-absorbing polymer compound (1) used in Example 1 was used without using any cationic polymer compound (2).

Comparative Example 2

An ink jet recording sheet of Comparative Example 2 was produced in a similar manner to the procedure in Example 1, except that the 20 parts by weight of the cationic polymer compound (2) that was used in Example 1 was substituted for 20 parts by weight of lauryl trimethylammonium chloride as a cationic surface active agent (3).

Test for Ink Absorption Ability

Printing was carried out on the ink jet recording sheet that were produced in each of the Examples and Comparative Examples, using ink jet printers (tradename "Epson PM750C"; and tradename "Canon BJC-455J"). At one minute after completion of the printing, printed portion of ink-receiving layer was rubbed softly with a finger, thus respective ink absorption ability was evaluated visually. The results were evaluated as: "●," highly excellent ink absorption ability without any change in the printed portion; "○," excellent ink absorption ability; "Δ," fairly inferior ink absorption ability; and "x," cases in which the ink came off with dirty printed portion. The results are illustrated in Table 1 below.

Test for Ink Blurring Property

The ink jet recording sheets, which were subjected to printing similarly to the above-described procedure, were left at a room temperature for 3 hours after completion of the printing. Then, the sheets were placed in a constant temperature and humidity chamber at a temperature of 35° C. and a humidity of 90%, and then blurring of ink was observed visually after 24 hours and 120 hours. The results were evaluated as: "1," any blurring was not observed at all; "2," slight extent of blurring was observed; "3," definite blurring was observed; and "4," blurring was manifested so that the printing became beyond recognition. The results are illustrated in Table 1 below.

TABLE 1

Results of evaluation on each of the ink jet recording sheets

| | | Example 1 | Example 2 | Example 3 | Example 4 | Comparative Example 1 | Comparative Example 2 |
|---|---|---|---|---|---|---|---|
| Ink absorption ability | PM750C | ○ | ○ | ○ | ○ | Δ | ○ |
| | BJC-455J | ● | ● | ● | ● | ○ | ● |
| Ink blurring property (after 24 hours) | PM750C | 1 | 1 | 1 | 1 | 4 | 2 |
| | BJC-455J | 1 | 1 | 1 | 1 | 3 | 2 |
| Ink blurring property (after 120 hours) | PM750C | 2 | 2 | 2 | 2 | 4 | 3 |
| | BJC-455J | 1 | 1 | 1 | 1 | 4 | 3 |

As is shown in Table 1, it was apparent that the ink jet recording sheet produced in each of the Examples was superior in respect to both of the ink absorption ability and ink blurring property when compared to those of the ink jet recording sheet produced in each of the Comparative Examples. Consequently, advantages of the present invention were demonstrated.

INDUSTRIAL APPLICABILITY

As explained herein above, according to the present invention, better ink absorption ability can be afforded when ink jet recording is carried out, and moreover, blurring of ink can be avoided that was conventionally disadvantageous in cases where hydrophilic polymer was used in an ink-receiving layer.

What is claimed is:

1. An ink jet recording sheet comprising a substrate layer consisting essentially of a material selected from a polyamide, a polyester, or a polyolefin and an ink-receiving layer that is overlaid directly onto said substrate layer, wherein said ink-receiving layer comprises (a) a major component of a water-absorbing polymer compound having a weight average molecular weight ranging between 10,000 and 300,000 represented by the formula (I).

  (I)

wherein A consists of

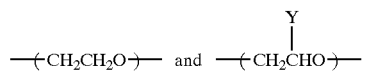

with a manner of linkage therebetween being

wherein m, n, and p represent integers greater than or equal to 1, and a weight ratio calculated on the basis of each recurrence number m, n, and p predetermined to be: 44×(m+p)/(molecular weight of the unit of the alkylene oxide having more than or equal to four carbon atoms)×n=94/6 to 80/20, and the weight ratio calculated on the basis of each recurrence number m and p, p/(m+p) is predetermined to be more than or equal to 50 percent by weight;

Y represents a hydrocarbon soup having two or more carbon atoms; $X^1$ represents a residue of an organic compound having two active hydrogen groups; and $R^1$ represents a residue of a dicarboxylic acid compound;

and (b) a cationic polymer compound having a weight average molecular weight ranging between 1,000 and 50,000 with a linear and irregular arrangement, comprising 65 mol % to 99 mol % of an ethylene structural unit represented by formula (II),

  (II)

less than or equal to 15 mol % of an acrylate structural unit represented by formula (III)

wherein $R^2$ represents an alkyl group having 1 to 4 carbon atoms, and 1 mol % to 35 mol % of an acrylamide structural unit represented by formula (IV)

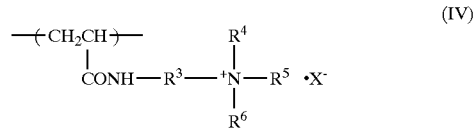  (IV)

wherein $R^3$ represents an alkylene group having 2 to 8 carbon atoms, $R^4$ and $R^5$, respectively, represent an alkyl group having 1 to 4 carbon atoms, $R^6$ represents an alkyl group having 1 to 12 carbon atoms, an aryl alkyl group having 7 to 12 carbon atoms, or an alicyclic alkyl group having 6 to 12 carbon atoms, and $X^-$ represents a halogen ion, $CH_3OSO_3^-$, or $C_2H_5OSO_3^-$.

2. A method of ink jet recording using an ink jet recording sheet according of claim 1, comprising the step of adsorbing small droplets of a water-based color ink applied to the ink-receiving layer.

3. A method of producing an ink jet recording sheet comprising the steps of extruding a resin composition selected from the group consisting essentially of a polyamide, a polyester, and a polyolefin that constitutes a substrate layer into a sheet form, while extruding a resin composition for ink jet recording sheet into a sheet form directly onto said substrate layer, concurrently with the substrate layer, and forming layers from both of said resin compositions, wherein the resin composition comprises (a) a major component of a water-absorbing polymer compound having a weight average molecular weight ranging between 10,000 and 300,000 represented by the formula (I),

  (I)

wherein A consists of

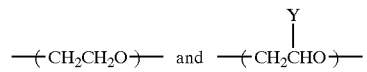

with a manner of linkage therebetween being

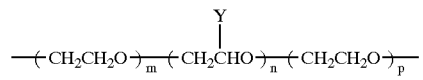

wherein m, n, and p represent integers greater than or equal to 1, and a weight ratio calculated on the basis of each recurrence number m, n, and p predetermined to be: 44×(m+p)/(molecular weight of the unit of the alkylene oxide having more than or equal to four carbon atoms)×n=94/6 to 80/20, and the weight ratio calculated on the basis of each recurrence number m and p, p/(m+p) is predetermined to be more than or equal to 50 percent by weight;

Y represents a hydrocarbon group having two or more carbon atoms; $X^1$ represents a residue of an organic compound having two active hydrogen groups; and $R^1$ represents a residue of a dicarboxylic acid compound;

and (b) a cationic polymer compound having a weight average molecular weight ranging between 1,000 and 50,000 with a linear and irregular arrangement, comprising 65 mol % to 99 mol % of an ethylene structural unit represented by formula (II),

  (II)

less than or equal to 15 mol % of an acrylate structural unit represented by formula (III)

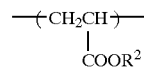

wherein $R^2$ represents an alkyl group having 1 to 4 carbon atoms, and 1 mol % to 35 mol % of an acrylamide structural unit represented by formula (IV)

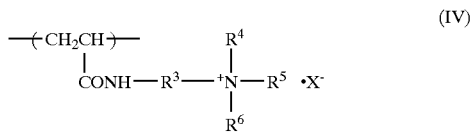 (IV)

wherein $R^3$ represents an alkylene group having 2 to 8 carbon atoms, $R^4$ and $R^5$, respectively, represent an alkyl group having 1 to 4 carbon atoms, $R^6$ represents an alkyl group having 1 to 12 carbon atoms, an aryl alkyl group having 7 to 12 carbon atoms, or an alicyclic alkyl group having 6 to 12 carbon atoms, and $X^-$ represents a halogen ion, $CH_3OSO_3^-$, or $C_2H_5OSO_3^-$.

4. An ink jet recording sheet comprising a substrate layer consisting essentially of a material selected from a polyamide, a polyester, or a polyolefin and an ink-receiving layer that is over-laid directly onto said substrate layer, wherein said ink-receiving layer comprises (a) a major component of a water-absorbing polymer compound having a weight average molecular weight ranging between 10,000 and 300,000 represented by the formula (I).

 (I)

wherein A consists of

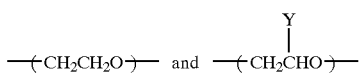

with a manner of linkage therebetween being

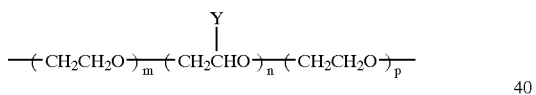

wherein m, n, and p represent integers greater than or equal to 1, and a weight ratio calculated on the basis of each recurrence number m, n, and p predetermined to be: 44×(m+p)/(molecular weight of the unit of the alkylene oxide having more than or equal to four carbon atoms)×n=94/6 to 80/20, and the weight ratio calculated on the basis of each recurrence number m and p, p/(m+p) is predetermined to be more than or equal to 50 percent by weight;

Y represents a hydrocarbon group having two or more carbon atoms; $X^1$ represents a residue of an organic compound having two active hydrogen groups; and $R^1$ represents a residue of a dicarboxylic acid compound;

and (b) a cationic polymer compound having a weight average molecular weight ranging between 1,000 and 50,000 with a linear and irregular arrangement, comprising 65 mol % to 99 mol % of an ethylene structural unit represented by formula (II),

 (II)

less than or equal to 15 mol % of an acrylate structural unit represented by formula (III),

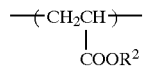

wherein $R^2$ represents an alkyl croup having 1 to 4 carbon atoms, and 1 mol % to 35 mol % of an acrylamide structural unit represented by formula (V),

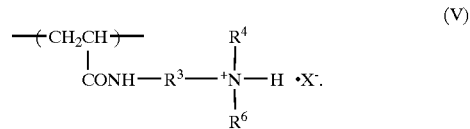 (V)

5. A method of ink jet recording using an ink jet recording sheet according to claim 4, comprising the step of adsorbing small droplets of a water-based color ink applied to the ink-receiving layer.

6. A method of producing an ink jet recording sheet comprising the steps of extruding a resin composition "selected from the group consisting essentially of a polyamide, a polyester, and a polyolefin", that constitutes a substrate layer into a sheet form, while extruding a resin composition for ink jet recording sheet into a sheet form directly onto said substrate layer, concurrently with the substrate layer, and forming layers from both of said resin compositions, wherein the resin composition comprises (a) a major component of a water-absorbing polymer compound having a weight average molecular weight ranging between 10,000 and 300,000 represented by the formula (I),

 (I)

wherein A consists of

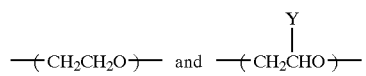

with a manner of linkage therebetween being

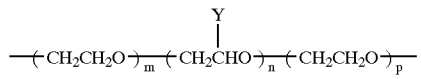

wherein m, n, and p represent integers greater than or equal to 1, and a weight ratio calculated on the basis of each recurrence number m, n, and p predetermined to be: 44×(m+p)/(molecular weight of the unit of the alkylene oxide having more than or equal to four carbon atoms)×n=94/6 to 80/20, and the weight ratio calculated on the basis of each recurrence number m and p, p/(m+p) is predetermined to be more than or equal to 50 percent by weight;

Y represents a hydrocarbon group having two or more carbon atoms; $X^1$ represents a residue of an organic compound having two active hydrogen groups; and $R^1$ represents a residue of a dicarboxylic acid compound;

and (b) a cationic polymer compound having a weight average molecular weight ranging between 1,000 and 50,000 with a linear and irregular arrangement, comprising 65 mol % to 99 mol % of an ethylene structural unit represented by formula (II),

  (II)

less than or equal to 15 mol % of an acrylate structural unit represented by formula (III),

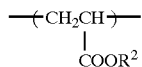  (III)

wherein $R^2$ represents an alkyl group having 1 to 4 carbon atoms, and 1 mol % to 35 mol % of an acrylamide structural unit represented by formula (V),

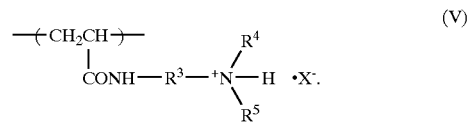  (V)

7. An ink jet recording sheet comprising a substrate layer selected from the group consisting essentially of a polyamide, a polyester, and a polyolefin and an ink-receiving layer that is overlaid directly onto said substrate layer, wherein said ink-receiving layer comprises (a) a major component of a water-absorbing polymer compound represented by the formula (I),

  (I)

wherein A consists of

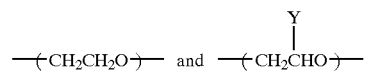

with a manner of linkage therebetween being

wherein m, n, and p represent integers greater than or equal to 1, and a weight ratio calculated on the basis of each recurrence number m, n, and p predetermined to be: 44×(m+p)/(molecular weight of the unit of the alkylene oxide having more than or equal to four carbon atoms)×n=94/6 to 80/20, and the weight ratio calculated on the basis of each recurrence number m and p, p/(m+p) is predetermined to be more than or equal to 50 percent by weight;

Y represents a hydrocarbon group having two or more carbon atoms; $X^1$ represents a residue of an organic compound having two active hydrogen groups; and $R^1$ represents a residue of a dicarboxylic acid compound;

and (b) a cationic polymer compound.

8. The ink jet recording sheet of claim 7, wherein the cationic polymer (b) has a weight average molecular weight ranging between 1,000 and 50,000 with a linear and irregular arrangement, comprising 65 mol % to 99 mol % of an ethylene structural unit represented by formula (II),

  (II)

less than or equal to 15 mol % of an acrylate structural unit represented by formula (III),

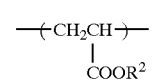  (III)

wherein $R^2$ represents an alkyl group having 1 to 4 carbon atoms, and 1 mol % to 35 mol % of an acrylamide structural unit represented by formula (IV),

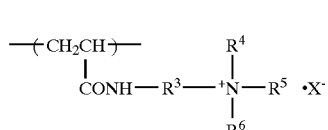  (IV)

wherein $R^3$ represents an alkylene group having 2 to 8 carbon atoms, $R^4$ and $R^5$, respectively, represent an alkyl group having 1 to 4 carbon atoms, $R^6$ represents an alkyl group having 1 to 12 carbon atoms, an aryl alkyl group having 7 to 12 carbon atoms, or an alicyclic alkyl group having 6 to 12 carbon atoms, and $X^-$ represents a halogen ion, $CH_3OSO_3^-$, or $C_2H_5OSO_3^-$.

9. The ink jet recording sheet of claim 7, wherein the cationic polymer (b) has a weight average molecular weight ranging between 1,000 and 50,000 with a linear and irregular arrangement, comprising 65 mol % to 99 mol % of an ethylene structural unit represented by formula (II),

  (II)

less than or equal to 15 mol % of an acrylate structural unit represented by formula (III),

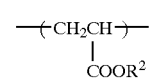  (III)

wherein $R^2$ represents an alkyl group having 1 to 4 carbon atoms, and 1 mol % to 35 mol % of an acrylamide structural unit represented by formula (V):

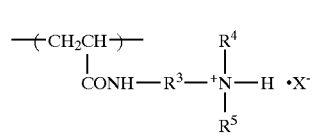  (V)

wherein $R^3$ represents an alkylene group having 2 to 8 carbon atoms, $R^4$ and $R^5$, respectively, represent an alkyl group having 1 to 4 carbon atoms, and $X^-$ represents a halogen ion, $CH_3OSO_3^-$ or $C_2H_5OSO_3^-$.

10. The ink jet recording sheet of claim 7 wherein a mixing ratio by weight of the water-absorbing polymer compound (a) and the cationic polymer compound (b) is between 50/50 and 99/1.

11. The ink jet recording sheet of claim 7 further comprising (c) a cationic or nonionic surface active agent.

12. The ink jet recording sheet of claim 11 wherein an amount of the cationic or nonionic surface active agent (c) is from 1% by weight to 10% by weight.

13. A method of producing an ink jet recording sheet comprising the steps of extruding a resin composition selected from the group consisting essentially of a polyamide, a polyester, and a polyolefin that constitutes a substrate layer into a sheet form, extruding a resin composition layer for ink jet recording into a sheet form, and overlaying the ink jet recording layer directly onto the substrate layer, wherein the ink jet recording layer comprises, (a) a major component of a water-absorbing polymer compound represented by the formula (I),

(I)

wherein A consists of

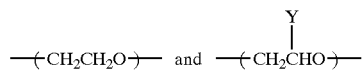

with a manner of linkage therebetween being

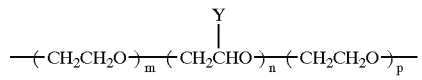

wherein m, n, and p represent integers greater than or equal to 1, and a weight ratio calculated on the basis of each recurrence number m, n, and p predetermined to be: 44×(m+p)/(molecular weight of the unit of the alkylene oxide having more than or equal to four carbon atoms)×n=94/6 to 80/20, and the weight ratio calculated on the basis of each recurrence number m and p, p/(m+p) is predetermined to be more than or equal to 50 percent by weight;

Y represents a hydrocarbon group having two or more carbon atoms; $X^1$ represents a residue of an organic compound having two active hydrogen groups; and $R^1$ represents a residue of a dicarboxylic acid compound;

and (b) a cationic polymer compound.

14. The method of claim 13, wherein the substrate layer and the ink jet recording layer are extruded concurrently while overlaying the ink jet recording layer onto the substrate layer.

15. A method in accordance with claim 13, wherein the water absorbing polymer compound (a) has a weight average molecular weight ranging between 10,000 and 300,000.

16. A method in accordance with claim 13, wherein the cationic polymer (b) has a weight average molecular weight ranging between 1,000 and 50,000 with a linear and irregular arrangement, comprising 65 mol % to 99 mol % of an ethylene structural unit represented by formula (II),

(II)

less than or equal to 15 mol % of an acrylate structural unit represented by formula (III),

(III)

wherein $R^2$ represents an alkyl group having 1 to 4 carbon atoms, and 1 mol % to 35 mol % of an acrylamide structural unit represented by formula (IV),

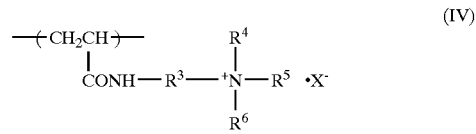
(IV)

wherein $R^3$ represents an alkylene group having 2 to 8 carbon atoms, $R^4$ and $R^5$, respectively, represent an alkyl group having 1 to 4 carbon atoms, $R^6$ represents an alkyl group having 1 to 12 carbon atoms, an aryl alkyl group having 7 to 12 carbon atoms, or an alicyclic alkyl group having 6 to 12 carbon atoms, and $X^-$ represents a halogen ion, $CH_3OSO_3^-$, or $C_2H_5OSO_3^-$.

17. A method in accordance with claim 13, wherein a mixing ratio by weight of the water-absorbing polymer compound (a) and the cationic polymer compound (b) is between 50/50 and 99/1.

18. A method in accordance with claim 13, further comprising (c) a cationic or nonionic surface active agent.

19. A method in accordance with claim 18, wherein an amount of the cationic or nonionic surface active agent (c) is from 1% by weight to 10% by weight.

* * * * *

UNITED STATES PATENT AND TRADEMARK OFFICE
CERTIFICATE OF CORRECTION

PATENT NO.    : 6,753,069 B1
DATED         : June 22, 2004
INVENTOR(S)   : Katsuaki Matsuo et al.

It is certified that error appears in the above-identified patent and that said Letters Patent is hereby corrected as shown below:

Column 13,
Line 2, delete "(I)." and insert -- (I), --.
Line 28, delete "soup" and insert -- group --.

Column 15,
Line 23, delete "(I)." and insert -- (I), --.

Column 16,
Line 7, delete "croup" and insert -- group --.
Line 14, delete "$R^6$" and insert -- $R^5$ --.
Lines 23-24, delete the quotes around the phrase "'selected from the group consisting essentially of a polyamide, a polyester, and a polyolefin'".

Signed and Sealed this

First Day of February, 2005

JON W. DUDAS
*Director of the United States Patent and Trademark Office*